United States Patent [19]

Breazeale

[11] 4,281,092
[45] Jul. 28, 1981

[54] VULCANIZABLE FLUORINATED COPOLYMERS

[75] Inventor: Almut F. Breazeale, Wilmington, Del.

[73] Assignee: E. I. Du Pont de Nemours and Company, Wilmington, Del.

[21] Appl. No.: 83,751

[22] Filed: Oct. 22, 1979

Related U.S. Application Data

[63] Continuation-in-part of Ser. No. 965,071, Nov. 30, 1978, abandoned.

[51] Int. Cl.$^3$ .................. C08F 8/00; C08F 214/26
[52] U.S. Cl. ................... 526/247; 525/331; 525/360
[58] Field of Search ............. 526/247; 525/331, 360

[56] References Cited

U.S. PATENT DOCUMENTS

| 3,282,875 | 11/1966 | Connolly et al. | 260/29.6 |
|---|---|---|---|
| 3,391,893 | 1/1967 | Putnam | 248/405 |
| 3,467,638 | 9/1969 | Pattison | 526/247 |
| 3,546,186 | 12/1970 | Gladding et al. | 526/245 |
| 3,852,326 | 12/1974 | Nottke | 260/465.6 |
| 3,853,720 | 12/1974 | Korach et al. | 204/98 |
| 3,853,721 | 12/1974 | Dartington et al. | 204/98 |
| 3,933,767 | 1/1976 | Nottke | 526/247 |
| 4,116,888 | 9/1978 | Ukihashi et al. | 526/247 |

FOREIGN PATENT DOCUMENTS

| 2504622 | 8/1975 | Fed. Rep. of Germany . |
|---|---|---|
| 2635312 | 2/1977 | Fed. Rep. of Germany . |
| 2638791 | 3/1977 | Fed. Rep. of Germany . |
| 2651531 | 5/1977 | Fed. Rep. of Germany . |
| 2659581 | 7/1977 | Fed. Rep. of Germany . |
| 52-003017 | 1/1977 | Japan . |
| 52-083417 | 7/1977 | Japan . |
| 52-105118 | 9/1977 | Japan . |

OTHER PUBLICATIONS

Fear, J. Appl. Chem. 5 pp. 589–594 (1955).
Heicklin, J. Phys. Chem. 70 pp. 618–627 (1966).
Ryazanova, Zh, Vses, Khim. Obschchest 17, No. 3, pp. 347–348 (1972).

*Primary Examiner*—Harry Wong, Jr.

[57] ABSTRACT

Vulcanizable copolymers of tetrafluoroethylene, perfluoromethyl perfluorovinyl ether and a cyano-substituted perfluorovinyl ether such as perfluoro-(8-cyano-5-methyl-3,6-dioxa-1-octene) and perfluoro-(9-cyano-5-methyl-3,6-dioxa-1-nonene) and elastomeric vulcanizates thereof.

10 Claims, No Drawings

VULCANIZABLE FLUORINATED COPOLYMERS

CROSS REFERENCE TO RELATED APPLICATION

This application is a continuation-in-part of my copending U.S. Application Ser. No. 965,071 filed Nov. 30, 1978 now abandoned.

DESCRIPTION

1. Technical Field

This invention relates to vulcanizable fluorinated copolymers derived from tetrafluoroethylene, perfluoromethyl perfluorovinyl ether and a cure site monomer, which copolymers are vulcanizable to useful elastomeric materials characterized by excellent physical properties and resistance to environmental attack. These materials can be fabricated into mechanical parts such as O-rings, flange seals, gasket stock, pump diaphragms and liners and are particularly useful where extraordinary resistance to heat and corrosive fluids is required. In particular, this invention relates to the improvement of the processing characteristics of such polymers and the improvement of the performance characteristics of the vulcanizates of such copolymers.

2. Background Art

U.S. Pat. No. 3,467,638, granted Sept. 16, 1969 to Pattison, discloses and claims certain vulcanizable fluorocarbon polymers. In particular, among the many and varied copolymers described by Pattison there are specifically disclosed terpolymers derived from tetrafluoroethylene, perfluoromethyl perfluorovinyl ether, and a cure-site monomer of the formula

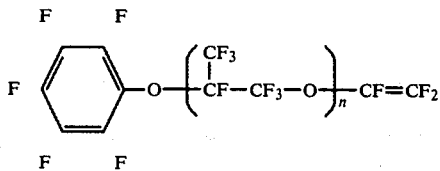

where n is 1 or 2.

U.S. Pat. No. 3,546,186, granted Dec. 8, 1970, to Gladding and Sullivan, discloses and claims certain vulcanizable copolymers of substituted perfluorovinyl ethers. In particular, among the many and varied copolymers described by Gladding and Sullivan there are specifically disclosed terpolymers derived from tetrafluoroethylene, perfluoroalkyl perfluorovinyl ehters of the formula $$CF_2=CF-O-R_f \qquad II$$

where $R_f$ is perfluoroalkyl of from 1 to 3 carbons, and a cure site monomer of the formula $$CF_2=CF-O-(CF_2)_n-X \qquad III$$

where X can be, among other things, —CN.

U.S. Pat. No. 3,933,767, granted Jan. 20, 1976, to Nottke, discloses and claims certain copolymers derived from cyanoperfluoroether acid fluorides. In particular, among the many and varied copolymers described by Nottke, there are specifically disclosed terpolymers derived from tetrafluoroethylene, perfluoroalkyl perfluorovinyl ethers of the formula $$CF_2=CF-O-R_f \qquad II$$

where $R_f$ is perfluoroalkyl of from 1 to 3 carbons, and a cure-site monomer of the formula

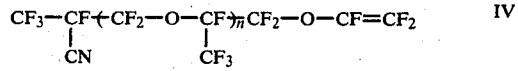

where n is an integer from 0 to 4.

DISCLOSURE OF THE INVENTION

The present invention relates to vulcanizable fluorinated copolymers derived from tetrafluoroethylene, perfluoroalkyl perfluorovinyl ether and a cure-site monomer of the formula

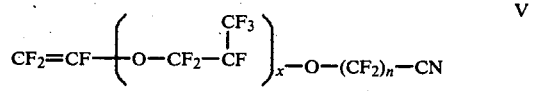

where $n=1-4$, preferably 2-3, most preferably $n=2$, and $x=1-2$, preferably $x=1$, and to the elastomeric vulcanizates thereof. The copolymers of the present invention possess surprisingly superior processing characteristics as compared with prior similar copolymers such as those of Pattison discussed above; in addition, the vulcanizates of the present invention possess surprisingly superior performance characteristics as compared with prior similar compositions.

In particular, the Pattison copolymers are generally cured by reaction with the potassium salt of bisphenol-AF accelerated by dicyclohexyl-18-crown-6 (see, e.g., U.S. Pat. No. 3,580,889). For optimum effect, crown levels of four or more parts per hundred parts of rubber are required. Even at these levels the rate of cure is so slow that parts which are molded at 190° C. must be cooled to room temperature before demolding to minimize sponging. Full cure is attained by means of a lengthy oven postcure during which distortion and backrinding can interfere with the quality of parts.

In contrast, the terpolymers of the present invention are cured by tetraphenyltin as described herein. The curing reaction does not require DCH-18-crown-6 so that the amount can be greatly reduced or even eliminated altogether. This plus a higher state of press cure than can be achieved with the DCH-18-crown-6 cure of the Pattison copolymers allow hot demolding of parts without sponging. Molding equipment is utilized more efficiently and energy consumption is reduced. Oven post curing of the copolymers of the present invention is still required for optimum cure; however, there is less distortion and parts quality is higher. The vulcanizate is more tightly crosslinked as shown by a significantly lower compression set. In addition, the vulcanizate is more resistant to hot air oxidation.

The terpolymers of the present invention comprise copolymerized units of 53–79.8 mole percent of tetrafluoroethylene (TFE), 20–45 mole percent of perfluoromethyl perfluorovinyl ether (PMVE), and 0.2–2 mole percent of a compound of formula V described above. Preferably, the terpolymer will be comprised of copolymerized units of 64.4–72.6 mole percent TFE, 27–35 mole percent PMVE and 0.4–1.0 mole percent of a compound of formula V. The most preferred terpolymer will be comprised of copolymerized units of approximately 69.3 mole percent TFE, 30 mole percent PMVE and 0.7 mole percent of the compound of formula V where n=2 and x=1, i.e., perfluoro-(8-cyano-5-methyl-3,6-dioxa-1-octene) (8-CNVE). The composition of the copolymers was estimated from their infrared spectra. The PMVE content was calculated from the intensity of the 11.25μ band which is characteristic of the trifluoromethoxyl group. The cure site monomer content was determined from the intensity of the band near 10.2μ which is characteristics of the perfluoroisopropylidene group.

Perfluoro-(7-cyano-5-methyl-3,6-dioxa-1-heptene) (the compound of formula V where n=1 and x=1) can be prepared as generally taught by the combined teachings of Japanese Patent Application No. 52-53,814 (published Apr. 30, 1977) and copending U.S. Patent Application Ser. No. 868,615, filed Jan. 11, 1978, by David Charles England, and now U.S. Pat. No. 4,138,426.

Perfluoro-2-(2-fluorosulfonylethoxy)-propyl vinyl ether (PSEPVE) is converted to the corresponding carboxylic acid according to the teachings of the above-mentioned Japanese application:

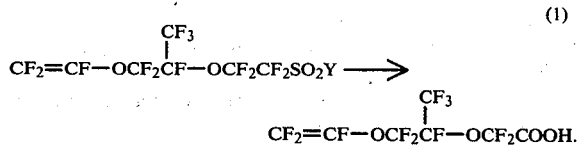

(1)

The resulting carboxylic acid can be converted to the corresponding cyano vinyl ether by esterification, aminolysis and dehydration according to the teachings of England:

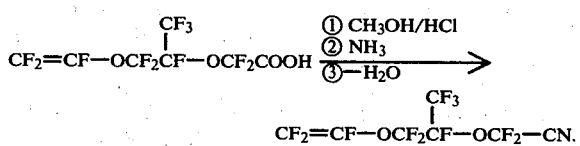

Alternatively, PSEPVE can be converted to the cyanovinyl ether while "protecting" the vinyl ether group by chlorine according to the following reaction sequence:

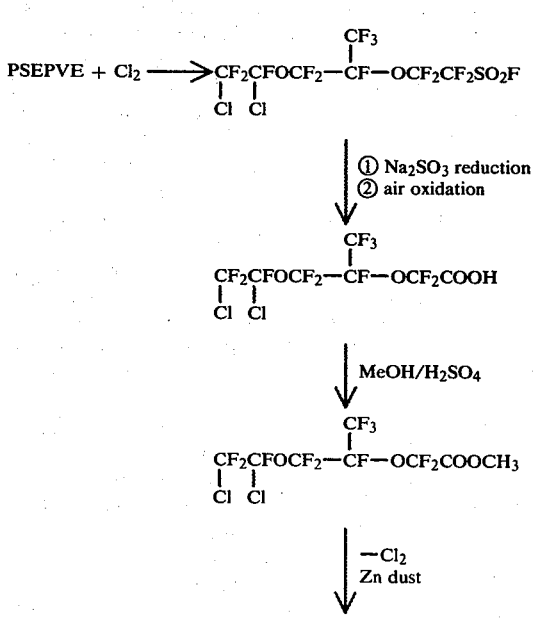

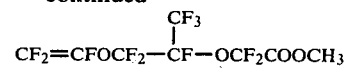

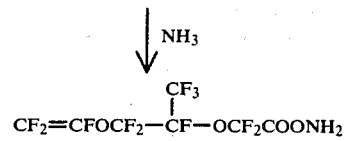

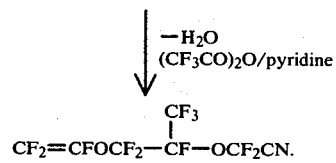

Perfluoro-(8-cyano-5-methyl-3,6-dioxa-1-octene) (8-CNVE) (the compound of formula V where n=2 and x=1) can be prepared as disclosed in copending U.S. Patent Application Ser. No. 868,615, filed Jan. 11, 1978, by David Charles England, now U.S. Pat. No. 4,138,426.

Lower alkyl β-alkoxytetrafluoropropionates (such as are disclosed in U.S. Pat. No. 2,988,537) are reacted with sulfur trioxide to obtain the corresponding carboalkoxydifluoroacetyl fluorides according to the following equation

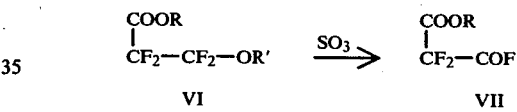

The compounds of formula VII are then reacted with hexafluoropropylene oxide to obtain the appropriate α-carboxylic-ω-carbonyl fluoride, according to the following equation

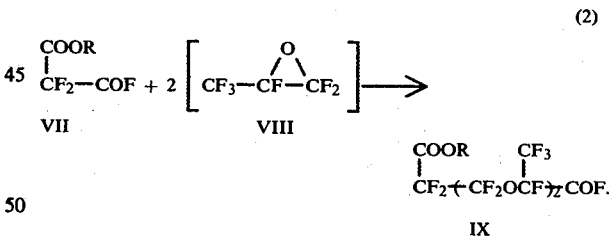

(2)

The reaction of compounds of formula VI with sulfur trioxide is exothermic and provision should be made for dissipating the heat of reaction. One method is to add the alkoxyester compound of formula VI in small portions to the SO₃ with cooling by reflux condenser or external cooling means. Sulfur trioxide can be used either in monomeric form or polymeric form. The reaction can be carried out neat. Temperatures at which the reaction is operable range from about −30° C. to about 250° C. The molecular proportions in which SO₃ and the compounds of formula VI can be brought together to carry out this reaction can be varied widely such as from about 1:20 to 20:1.

The reaction of a compound of formula VII with hexafluoropropylene oxide is preferably carried out in the presence of fluoride ion as a catalyst. This is readily accomplished by using a suitable fluoride, e.g., an alkali metal fluoride such as cesium fluoride, potassium fluoride; silver fluoride; ammonium fluoride; a tetraalkylammonium fluoride (alkyl of 1–4 carbons) such as tetramethylammonium fluoride, tetraethylammonium fluoride, and tetrabutylammonium fluoride, and sulfonium fluorides such as benzene sulfonium fluoride. The fluoride catalyst is usually used in conjunction with an inert liquid diluent in which the selected fluoride is at least 0.001% soluble. The fluoride catalyst may be used in amounts from about 0.001 to about 1.0 molar equivalent per mole of the compound of formula VII. Suitable diluents include ethylene glycol dimethyl ether, diethylene glycol dimethyl ether, tetraethylene glycol dimethyl ether, and aprotic solvents such as acetonitrile. The reaction is somewhat exothermic and provision for dissipation of the heat of reaction should be made. Temperatures employed can range from about −50° C. to about 200° C. Pressure is not a critical variable. Operable molar proportions of hexafluoropropylene oxide to the compounds of formula VII can vary from about 1:20 to about 20:1.

Two moles of hexafluoropropylene oxide will react with a compound of formula VII to yield compounds of formula IX if appropriate molecular proportions of the reactants are chosen and temperature and pressure are adjusted to favor the desired product.

The compounds of formulae VII and IX are reactive organic compounds which are at once carboxylic esters and acid fluorides. Such fluorinated compounds are rare, and understandably so because the known processes for synthesizing difunctional carboxylic compounds readily yield dicarboxylic esters as well as diacid fluorides but teach almost nothing about how to obtain compounds with both a carboxylic ester group and a carbonyl fluoride group in the same molecule. In carrying out reactions with compounds of formulae VII and IX care must be taken to prevent their ready conversion to the more ordinary corresponding dicarboxylic esters or dicarbonyl fluorides.

In turn, the compounds of formula IX can be pyrolyzed over a solid basic salt such as sodium phosphate, sodium carbonate or potassium carbonate at moderate temperatures to obtain the corresponding ester vinyl ether of formula X according to the following equation

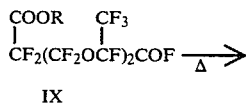

IX

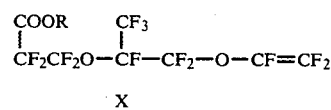

X

The compounds of formula X can be converted to 8-CNVE by aminolysis and dehydration according to the following equation

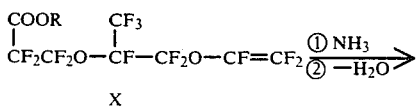

X

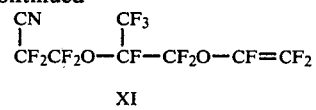

XI

Perfluoro (9-cyano-5-methyl-3,6-dioxa-1-nonene) (the compound of formula V where n=3 and x=1) can be prepared as generally taught by the combined teachings of German Offenlegungsschrift No. 2,635,312 (published Feb. 17, 1977), German Offenlegungsschrift No. 2,651,531 (published May 12, 1977), Japanese Patent Application No. 52-083,417 (published June 2, 1977), and Japanese Patent Application No. 52-105,118 (published Sept. 3, 1977), all filed by Asahi Glass Co., Ltd., and the above-mentioned copending U.S. Ser. No. 868,615, now U.S. Pat. No. 4,138,426.

1,4-Diiodooctafluorobutane is reacted with fuming sulfuric acid to form a lactone according to the following equation

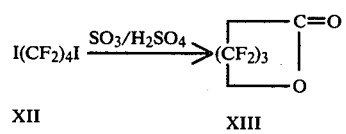

XII         XIII

The lactone of formula XIII is reacted with an alcohol, such as methanol, to form a half acid fluoride - half ester according to the following equation

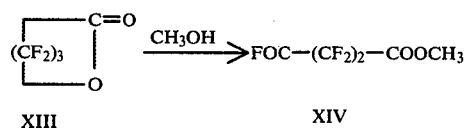

XIII         XIV

The compound of formula XIV is reacted with hexafluoropropylene oxide to form the corresponding adduct, according to the following equation (3)

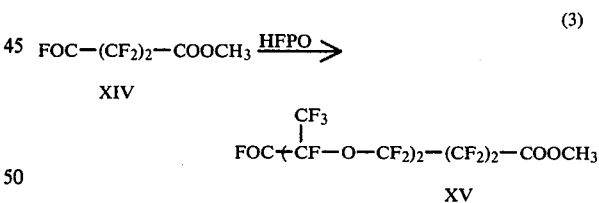

XV

The adduct of formula XV is pyrolized over sodium carbonate to form the corresponding ester vinyl ether according to the following formula:

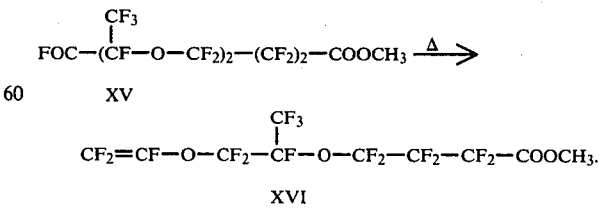

XVI

The ester vinyl ether of formula XVI is converted to the corresponding primary cyano substituted polymerizable monomer according to the following equation:

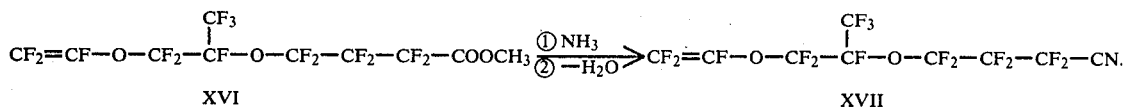

XVI                            XVII

Further details of the reaction scheme summarized above can be found in the German and Japanese patents listed immediately above the preceding summary of the present reaction sequence.

Perfluoro(10-cyano-5-methyl-3,6-dioxa-1-decene) (the compound of formula V where n=4 and x=1) can be prepared as shown schematically below:

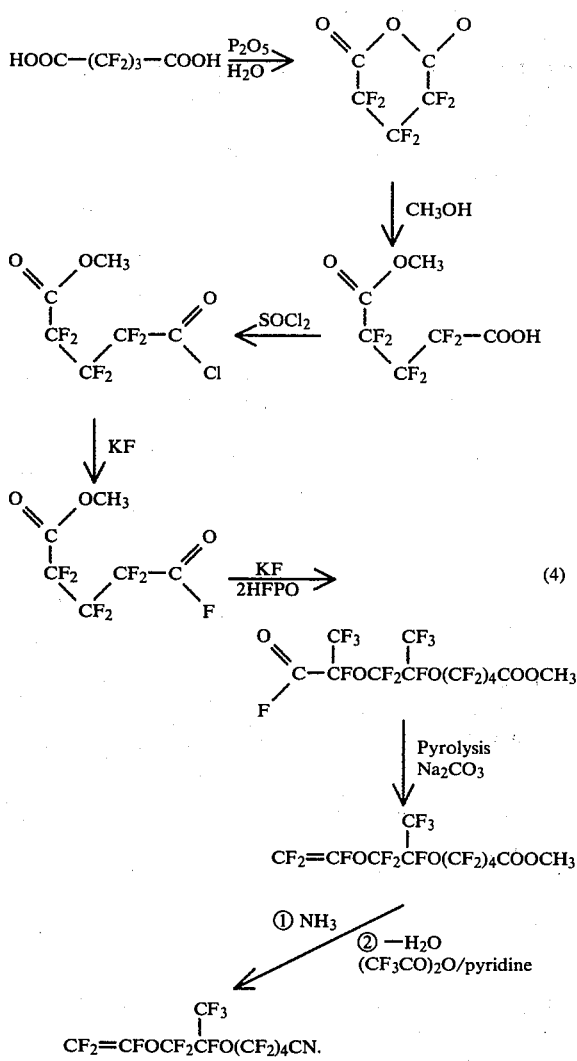

Synthesis of the compounds of formula V where x=2 can be accomplished by procedures similar to those described above except that for the compound where x=2 and n=1, one starts with

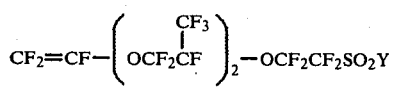

(disclosed in U.S. Pat. No. 3,282,875) in equation (1), above, and for the compounds where x=2 and n=2–4, one introduces excess hexafluoropropyleneoxide (HFPO) wherever HFPO would have normally been introduced, i.e., in equations (2), (3), and (4), above.

The copolymers of this invention can be prepared by polymerization of the appropriate monomer mixtures with the aid of a free radical generating initiator either in bulk, in solution in an inert solvent such as a completely halogenated chloro- or fluoro-carbon or, preferably, in an aqueous emulsion system.

When the polymerization is carried out in the preferred aqueous emulsion system, the preferred free-radical generating initiators are water soluble inorganic peroxides such as ammonium, sodium or potassium persulfates. Other suitable initiators include ammonium, sodium, or potassium perphosphates, perborates and percarbonates. These oxidizing materials can be used in combination with a reducing agent such as ammonium, sodium or potassium sulfite, bisulfite, metabisulfite, hyposulfite, thiosulfate, phosphite, or hypophosphite. Known organic free-radical initiators such as perfluoroalkyl- or perfluoroacyl-peroxides can also be used, particularly when the polymerization is carried out in an inert organic solvent.

It is frequently useful to include a surface active agent in an aqueous emulsion polymerization system. The surfactant can be any one or a combination of known soaps and detergents, provided the surfactant does not inhibit the polymerization; perfluorocarbon carboxylates, such as ammonium perfluorooctonoate, are preferred.

The polymerization can be carried out in a pressure vessel in which the contents are stirred and heated, preferably at a temperature of 65° to 85° C. and a pressure of 3 to 8 MPa. It is usually preferred to run the reaction in a continuous manner, pumping water and reactants into the reaction vessel and removing product dispersion at the same rate. In such an arrangement it is convenient to have separate feed streams for the gaseous monomer mixture, liquid monomer and aqueous solutions of initiator components and surfactant.

The product of an aqueous emulsion polymerization is in the form of a latex from which the elastomer is separated by addition of a coagulant, filtration or centrifugation, washing and drying. For this purpose the coagulant can be a water soluble electrolyte salt or a highly polar water soluble organic compound, e.g., triethylenetetraamine.

Vulcanization of the polymers of the present invention is accomplished by heating them in the presence of substances known to promote the formation of triazine rings by trimerization of nitriles. These include the organometallic compounds of arsenic, antimony and tin described in U.S. Pat. Nos. 3,470,176 and 3,546,186 and the metal oxides described in U.S. Pat. No. 3,523,118. It is particularly preferred to use tetraphenyltin as the catalyst for the vulcanization reaction.

As with other vulcanizable elastomer compositions, it is frequently useful to mix fillers, reinforcing agents, stabilizers, plasticizers, lubricants or processing aids with the elastomer prior to vulcanization. The most frequently used of these is carbon black which acts in several capacities as filler, reinforcer, light screen and antioxidant. Another useful ingredient in formulations of this invention is a cyclic polyether ("crown") compound which reduces viscosity and improves processability.

The polymer and other components of the vulcanizate are mixed together by any convenient means, usually on a two-roll mill at 40° to 100° C. The mixed composition is shaped and vulcanized by pressing it into a mold and heating at 160° to 250° C. for 30–60 minutes. It is preferred to then post-cure the piece by heating it in an inert atmosphere, e.g., nitrogen, for a number of hours at higher temperature.

When the polymers of this invention are vulcanized in this manner, they have higher thermal and oxidative stability, better resistance to compression set, and better resistance to acids as compared to the prior art compositions. They also provide other advantages in easier processing, higher quality parts, and reduced cost.

The following examples illustrate the preparation of the preferred polymers of the present invention.

EXAMPLE 1

Terpolymer of Tetrafluoroethylene, Perfluoro-(methyl vinyl ether) and Perfluoro-(7-cyano-5-methyl-3,6-dioxa-1-heptene)

Terpolymer latice was prepared in a 400 ml stainless steel shaker tube into which the following reagents were introduced:

| | |
|---|---|
| Ammonium persulfate | 3.0 grams |
| Sodium sulfite | 0.6 grams |
| Ammonium perfluorooctanoate | 2.0 grams |
| Sodium hypophosphate | 3.5 grams |
| Distilled water | 200 grams |
| Tetrafluoroethylene | 26 grams |
| Perfluoro-(methyl vinyl ether) | 54 grams |
| Perfluoro-(7-cyano-5-methyl-3,6-dioxa-1-heptene) | 2.2 grams |

The tube is sealed, heated to 50° C. and shaken for eight hours. This procedure was repeated in two additional runs. Latices from the three runs were combined and isolated by precipitation with magnesium chloride/ethanol in a blender. 109 Grams of polymer was obtained (after drying) and analysis by IR spectroscopy gave the following:
mole % PMVE: 29
mole % 7-CNVE: 0.5

EXAMPLE 2

Terpolymer of Tetrafluoroethylene, Perfluoro-(methyl vinyl ether) and Perfluoro-(8-cyano-5-methyl-3,6-dioxa-1-octene)

The polymerization was done in a 3800 ml mechanically agitated, water-jacketed, stainless steel autoclave operated continuously at a temperature of 70° C. and a pressure of 4.1 MPa. Tetrafluoroethylene and perfluoro-(methylvinyl ether) were pumped in at the rate of 250 and 300 g/hr respectively, by means of a diaphragm compressor. Perfluoro-(8-cyano-5-methyl-3,6-dioxa-1-octene) was fed neat at the rate of 11.3 g/hr (29 mmole/hour). Each of two aqueous redox initiator solutions were pumped in separately at the rate of 600 ml/hr. The peroxide initiator solution A was prepared by dissolving 85 g ammonium persulfate, 50 g disodium phosphate hepta-hydrate and 160 g ammonium perfluorooctanoate in 8 liters de-aerated distilled water.

Initiator solution B was prepared by dissolving 70 g sodium sulfite in 8 l de-aerated distilled water.

Polymer latex was removed continuously through a let-down valve and unreacted monomers were vented. Over a period of six hours 10.1 kg latex was collected.

Latex was coagulated by adding it to a solution consisting of 382 g magnesium chloride hexahydrate in 8.5 liters water, 8.5 liters ethanol, and 10 ml dilute sulfuric acid. The coagulated polymer was washed and isolated in the three-tank cascade process described in U.S. Pat. No. 3,752,789. The wet crumb was dried by heating in air at 75° C. for eight hours, then for two days at 125° C. in a vacuum oven. The yield of terpolymer was 2.25 kg. It contained about 31 mole % perfluoro(methylvinyl ether), about 0.4 mole % perfluoro-(8-cyano-5-methyl-3,6-dioxa-1-octene), and had an inherent viscosity of 0.80 dl/g (measured in a solution containing 0.1 gram of polymer per 100 grams of solvent consisting of a 60/40/3 volume ratio of hepta-fluoro-2,2,3-trichlorobutane, perfluoro(butyltetrahydrofuran) and ethylene glycol dimethyl ether.

EXAMPLE 3

Terpolymer of Tetrafluoroethylene, Perfluoro(methyl vinyl ether) and Perfluoro-(8-cyano-5-methyl-3,6-dioxa-1-octene)

The polymerization was carried out essentially as described in Example 2. Conditions were modified as follows. The TFE feed was increased to 265 g/hr. The perfluoro-(8-cyano-5-methyl-3,6-dioxa-1-octene) feed was increased to 15.8 g/hr (41 millimoles/hr). The two initiator solutions were pumped in at the reduced rate of 500 ml/hr and their concentrations were increased as follows. The peroxide initiator solution A consisted of 125 g ammonium persulfate, 88 g disodium hydrogen phosphate heptahydrate, 235 g ammonium perfluorooctanoate dissolved in 8 l de-aerated distilled water. Initiator solution B was prepared by dissolving 103 g sodium sulfite in 8 l de-aerated distilled water.

The polymer latex collected over a period of 18 hours was isolated and dried as described in Example 1 to yield 6.6 kg polymer crumb. It contained 29.6 mole % PMVE and about 0.7 mole % of perfluoro-(8-cyano-5-methyl-3,6-dioxa-1-octene). The inherent viscosity was 0.75 dl/g in the solvent mixture described in Example 1.

EXAMPLE 4

Terpolymer of Tetrafluoroethylene, Perfluoro-(methyl vinyl ether) and Perfluoro-(10-cyano-5-methyl-3,6-dioxa-1-decene)

The polymerization was carried out essentially as described in Example 1, except that 3.5 grams of perfluoro-(10-cyano-5-methyl-3,6-dioxa-1-decene) was charged into the shaker tube in each of three runs (instead of the 2.2 grams of 7-CNVE). 134 Grams of polymer (after drying) was obtained and analysis by IR spectroscopy gave the following:
mole % PMVE 34
mole % 10-CNVE 0.6

EXAMPLE 5

Terpolymer of Tetrafluoroethylene, Perfluoro-(methyl vinyl ether) and Perfluoro-(11-cyano-5,8-dimethyl-3,6,9-trioxa-1-undecene)

The polymerization was carried out essentially as described in Example 1, except that 4.0 grams of perfluoro-(11-cyano-5,8-dimethyl-3,6,9-trioxa-1-undecene) was charged into the shaker tube in each of four runs (instead of the 2.2 grams of 7-CNVE in each of three runs). 183 Grams of polymer (after drying) was obtained and analysis by IR spectroscopy gave the following:

mole % PMVE 34
mole % 11-CNVE 0.9

The following example illustrates the preparation of one of the prior art polymers described by Nottke in U.S. Pat. No. 3,933,767.

EXAMPLE 6

Terpolymerization of Tetrafluoroethylene, Perfluoro-(methylvinyl ether) and Perfluoro-(8-cyano-5-methyl-3,6-dioxa-1-nonene)

The polymerization and isolation was carried out in the same equipment and under essentially the same conditions as described in Example 1 except that a different curesite monomer, i.e., a curesite monomer of Nottke, perfluoro-(8-cyano-5-methyl-3,6-dioxa-1-nonene), was added at a slightly higher rate–14.2 g/hr. (32 mmole/hour). Polymer was isolated by essentially the same method as described in Example 1. The dried polymer contained 32.4% PMVE and an undetermined amount of 8-cyano-5-methyl-3,6-dioxa-1-nonene. It had an inherent viscosity of 0.83 dl/g as measured in the solvent mixture described in the previous example.

Vulcanization of Terpolymers

Each terpolymer from Examples 1–6 was mixed with compounding ingredients on a two-roll rubber mill. Slabs (15.2×15.2×0.19 cm) and pellets (1.27×1.90 cm) were press-cured, post-cured and tested. Pertinent compounding, curing and testing data are given in Table I.

The terpolymers from Examples 1–5 cured to give attractive vulcanizates with excellent physical properties. In contrast, the terpolymer from Example 6, i.e., the terpolymer of Nottke, failed to cure properly and was so badly blistered and distorted as to be untestable.

TABLE I

| Terpolymer from Example | 1 | 2 | 3 | 4 | 5 | 6 |
|---|---|---|---|---|---|---|
| Compound Recipe | | | | | | |
| Terpolymer | 100 | 100 | 100 | 100 | 100 | 100 |
| Dicyclohexyl-18-crown-6 | 0.30 | 0.30 | — | 0.30 | 0.30 | — |
| Tetraphenyltin | 3.0 | 3.0 | 3.0 | 3.0 | 3.0 | 6.0 |
| Carbon Black SAF | 10 | 10 | 10 | 10 | 10 | 10 |
| Micro ODR (190° C.) | | | | | | |
| ΔTorque (30 min.) | 13 | 5.3 | 11.5 | 9.7 | 5.4 | — |
| ΔTorque (60 min.) | 21 | 9.3 | 16.1 | 13.3 | 9.0 | — |
| Press Cured: Minutes | 30 | 30 | 30 | 30 | 30 | 45 |
| Temperature | 210° C. | 190° C. | 220° C. | 190° C. | 210° C. | 190° C. |
| Post Cured: Temp °C./hrs. (Under Nitrogen) | 25° to 204° in 6 hrs. 204°/18 hrs. 204° to 288° in 6 hrs. 288°/18 hrs. | 25° to 204° in 6 hrs. 204°/18 hrs. 288°/18 hrs. | Same post cure as Ex. 2 | Same post cure as Ex. 1 | Same post cure as Ex. 1 | 25° to 150° in 6 hrs. 150° C./24 hrs. 177° C./24 hrs. 204° C./24 hrs. 288° C./24 hrs. |
| Appearance Properties (at 25° C.) | Intact | Intact | Intact | Intact | Intact | Slab blistered pellets sponged and distorted |
| Tensile Test (ASTM D412-Method A, Small Dumbbells) Stress at 100% Elong. MPa | 18.0 | 6.4 | 6.8 | 9.1 | 8.2 | Not testable |
| Stress at Break, MPa | 19.5 | 17.0 | 13.4 | 17.9 | 18.2 | |
| Elongation at Break, % | 110 | 170 | 140 | 140 | 170 | |
| Compression Set (70 hrs/204° C.) (ASTM D395), % | 21 | 35 | 20 | 20 | 25 | Not testable |

Industrial Applicability

The elastomeric polymers of the present invention are useful in the manufacture of finished parts such as O-rings, flange seals, gasket stock, pump diaphragms and liners. The extraordinary physical properties and resistance to environmental attack make these polymers particularly well suited for applications in process streams subject to severe fluid service at in-line temperatures as high as 700° F. or in streams carrying highly corrosive fluids, such as hydrogen sulfide.

Best Mode

Although the best mode of the present invention, i.e., the single best copolymer of the present invention, will depend upon the particular desired end use and the specific requisite combination of properties for that use, the single most preferred composition of the present invention is that described in detail in Example 3.

I claim:

1. A copolymer, the elastomeric vulcanizate of which is suitable for use where extraordinary resistance to environmental attack by a temperature of 700° F. and corrosive fluids is required, comprising copolymerized units of:
   (a) 53–79.8 mole percent tetrafluoroethylene,
   (b) 20–45 mole percent perfluoromethyl perfluorovinyl ether, and
   (c) 0.2–2 mole percent of a cure site monomer of the formula:

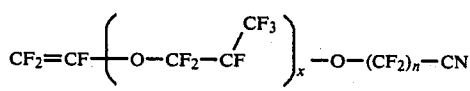

where n=1-4 and x=1-2.

2. The copolymer of claim 1 wherein component monomer (a) comprises 64.4-72.6 mole percent, component monomer (b) comprises 27-35 mole percent, component monomer (c) comprises 0.4-1.0 mole percent.

3. The copolymers of claim 2 wherein the component monomer (c) comprises a compound of the formula:

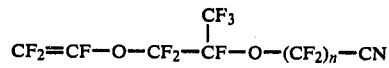

where n=2-3.

4. The copolymer of claim 3 wherein the component monomer (c) comprises the compound perfluoro(8-cyano-5-methyl-3,6-dioxa-1-octene).

5. The copolymer of claim 4 wherein component monomer (a) comprises about 69.3 mole percent, component monomer (b) comprises about 30 mole percent, and component monomer (c) comprises about 0.7 mole percent.

6. The vulcanized copolymer of claim 1.
7. The vulcanized copolymer of claim 2.
8. The vulcanized copolymer of claim 3.
9. The vulcanized copolymer of claim 4.
10. The vulcanized copolymer of claim 5.

* * * * *